(12) United States Patent
Dubus et al.

(10) Patent No.: US 10,436,347 B2
(45) Date of Patent: Oct. 8, 2019

(54) VALVE OPERATOR ASSEMBLY WITH DOUBLE SCREW MECHANISM

(71) Applicant: Aktiebolaget SKF, Gothenburg (SE)

(72) Inventors: Jerome Dubus, Aix les Bains (FR);
David Richardet, Viviers-du-Lac (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/578,115

(22) PCT Filed: Jun. 1, 2015

(86) PCT No.: PCT/EP2015/062089
§ 371 (c)(1),
(2) Date: Nov. 29, 2017

(87) PCT Pub. No.: WO2016/192769
PCT Pub. Date: Dec. 8, 2016

(65) Prior Publication Data
US 2018/0156350 A1    Jun. 7, 2018

(51) Int. Cl.
*F16K 31/50*    (2006.01)
*F16H 25/20*    (2006.01)

(52) U.S. Cl.
CPC .......... *F16K 31/504* (2013.01); *F16H 25/20* (2013.01); *F16K 31/506* (2013.01); *F16K 31/508* (2013.01); *F16H 2025/2087* (2013.01)

(58) Field of Classification Search
CPC .... F16K 31/504; F16K 31/506; F16K 31/508; F16H 25/20; F16H 2025/2087

USPC .......... 251/264, 266, 229, 215, 218
See application file for complete search history.

(56) References Cited

U.S. PATENT DOCUMENTS

| 104,037 | A | * | 6/1870 | King | F16K 31/508 251/266 |
| 236,780 | A | * | 1/1881 | Coffin | F16K 31/508 251/266 |
| 324,486 | A | * | 8/1885 | Reilly | F16K 31/508 251/266 |

(Continued)

FOREIGN PATENT DOCUMENTS

| EP | 1419334 A1 | 5/2004 |
| WO | 2015007308 A1 | 1/2015 |

(Continued)

*Primary Examiner* — John Bastianelli
(74) *Attorney, Agent, or Firm* — Laurence A. Greenberg; Werner H. Stemer; Ralph E. Locher

(57) ABSTRACT

A valve operator assembly is provided for a valve and includes a housing, an input member rotatably mounted with respect to the housing, and a transmission mechanism having a rotating screw provided with an outer thread and a translating nut surrounding and coaxial with the screw, the nut being provided with an inner thread, the transmission mechanism being adapted to convert rotation of the screw into axial translation of the nut. The input member is mounted on the rotating screw. The assembly further includes an outer translating sleeve radially disposed between the housing and the translating nut and adapted to be connected to the valve translating member of the valve. The outer translating sleeve is provided with an inner thread and is connected to the translating nut so as to slide relative to the housing when the rotating screw rotates.

15 Claims, 8 Drawing Sheets

(56) References Cited

U.S. PATENT DOCUMENTS

| | | | | |
|---|---|---|---|---|
| 696,434 | A | * | 4/1902 | Hedges ................. F16K 31/508 251/266 |
| 4,592,534 | A | * | 6/1986 | Ueda ........................ F16K 3/22 251/266 |
| 5,313,852 | A | | 5/1994 | Arena |
| 6,318,516 | B1 | * | 11/2001 | Zernickel ............. B60T 13/741 188/157 |
| 6,918,574 | B2 | * | 7/2005 | Hallden ................ F16K 3/0254 251/267 |
| 7,044,012 | B2 | * | 5/2006 | Dubus ................. F16H 25/2252 74/89.35 |
| 8,851,451 | B2 | * | 10/2014 | Orino ...................... C10B 25/10 137/553 |
| 2017/0211670 | A1 | | 7/2017 | Boch et al. |

FOREIGN PATENT DOCUMENTS

| | | |
|---|---|---|
| WO | 2016134742 A1 | 9/2016 |
| WO | 2016134743 A1 | 9/2016 |

* cited by examiner

VALVE OPERATOR ASSEMBLY WITH DOUBLE SCREW MECHANISM

CROSS REFERENCE

This is a United States National Stage Application claiming the benefit of International Application Number PCT/EP2015/062089 filed on Jun. 1, 2015, which is incorporated herein by reference in its entirety.

TECHNICAL FIELD

The present invention relates to the fields of valves and manually operable valves, for instance gate valves, control or regulation valves or chokes valves. More particularly, the invention relates to a valve operator assembly for a gate valve.

BACKGROUND

Valves are used in a variety of industries to control the flow of fluids. In particular, gate valves are used extensively in the oil and gas industry to control the flow of produced fluids at various stages of production. Most gate valves used in this industry comprise a valve body having a longitudinal flow bore and a transverse gate cavity that intersects the flow bore. A gate having a gate opening extending transversely therethrough is disposed in the gate cavity. A valve stem is provided for moving the gate between an open position, in which the gate opening is aligned with the flow bore, and a closed position, in which the gate opening is offset from the flow bore. The gate cavity of the valve body is covered by a bonnet having an axial bore transverse to the flow through which passes the valve stem.

Such a gate valve is usually associated to a valve operator assembly for selectively driving the valve stem up and down in order to close and open the gate valve. The valve operator assembly generally comprises a transmission mechanism to convert the rotational motion of a drive input into axial motion of the valve stem. To quickly open and close the gate valve with a minimum number of turns, the transmission mechanism may be a ball screw mechanism or a planetary roller screw mechanism in order to reduce the operating torque, for instance manual hand-wheel torque or powered with electric, hydraulic or pneumatic drive for surface valves or with remote operating vehicle (ROV) torque tool or electric or hydraulic actuation for subsea valves. For more details, it is possible for example to refer to the patent EP-B1-1 419 334 (SKF).

When operating a gate valve, the force to apply to the valve stem is usually maximum at the beginning of the valve opening and also at the end of the valve closing. Then the force to apply is less important and substantially constant. Accordingly, the required operating torque on the rotational wheel, such as a manual hand-wheel, is usually much higher at the start of the valve opening and at the end of the valve closing.

One aim of the present invention is to overcome this drawback.

SUMMARY

It is a particular object of the present invention to provide a valve operator assembly for valve, for instance gate valve, control or regulation valve or choke valve, wherein the required torque for operating said valve is optimized.

In one embodiment, the valve operator assembly is provided for a valve comprising a valve body and a valve translating member axially moveable. The assembly comprises a housing adapted to be mounted on the valve, an input member rotatably mounted with respect to said housing, and a transmission mechanism comprising a rotating screw provided with an outer thread and a translating nut surrounding and coaxial with said screw, said nut being provided with an inner thread. Said transmission mechanism is adapted to convert rotation of said screw into axial translation of said nut.

The input member is mounted on the rotating screw. The assembly further comprises an outer translating sleeve radially disposed between the housing and the translating nut and adapted to be connected to the valve translating member of the valve. The outer translating sleeve is provided with an inner thread and is connected to the translating nut so as to slide relative to the housing when the rotating screw rotates.

The valve operator assembly has a double lead. A first lead is obtained when the outer sleeve axially moves together with the nut with respect to the screw. A second lead is obtained when the outer sleeve axially moves with respect to the nut and the screw without axial relative movement between said nut and said screw. The number of turns required to travel the stroke to open or close may be minimized while keeping a low operating torque.

In one embodiment, the valve operator assembly further comprise axial guide means provided both on the outer translating sleeve and the housing so as to guide axial movements of said sleeve relative to said housing. Preferably, the axial guide means also form anti-rotation means to prevent angular movement of the outer translating sleeve relative to the housing. The anti-rotation and axial guide means may comprise at least one protruding element secured to the outer translating sleeve, or to the housing, and at least one straight axial anti-rotation portion provided on the housing, or on the outer translating sleeve, and cooperating with said protruding element.

Preferably, the friction torque induced by the connection between the outer translating sleeve and the translating nut of the transmission mechanism is different from the friction torque induced by said transmission mechanism.

In one embodiment, the valve operator assembly further comprises an adapter shaft secured to the outer translating sleeve and adapted to be connected to the valve translating member of the valve.

The input member may comprise an operable wheel directly or indirectly mounted on the rotating screw of the transmission mechanism.

In one embodiment, the transmission mechanism further comprises rolling elements which are radially provided between the outer thread of the screw and the inner thread of the translating nut and which engage said threads. Alternatively, the inner thread of the translating nut may be engaged with the outer thread of the rotating screw of said mechanism.

The inner thread of the outer translating sleeve may be engaged with an outer thread provided on the translating nut of the transmission mechanism. Alternatively, the valve operator assembly further comprises rolling elements which are radially provided between the inner thread of the outer translating sleeve and an outer thread provided on the translating nut of the transmission mechanism, said rolling elements engaging said threads.

In one embodiment, the valve operator assembly further comprises abutment and coupling means for blocking the translation of the translating nut of the transmission mechanism relative to the screw and maintaining a coupling state between said nut and said screw. Alternatively, the assembly may comprise abutment and coupling means for blocking the translation of the outer translating sleeve relative to the translating nut of the transmission mechanism and maintaining a coupling state between said sleeve and said nut.

In one embodiment, the valve operator assembly further comprises at least one bearing radially provided between the rotating screw of the transmission mechanism and the housing.

The invention also relates to a valve comprising a valve body, a valve translating member axially moveable and a valve operator assembly as previously defined.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
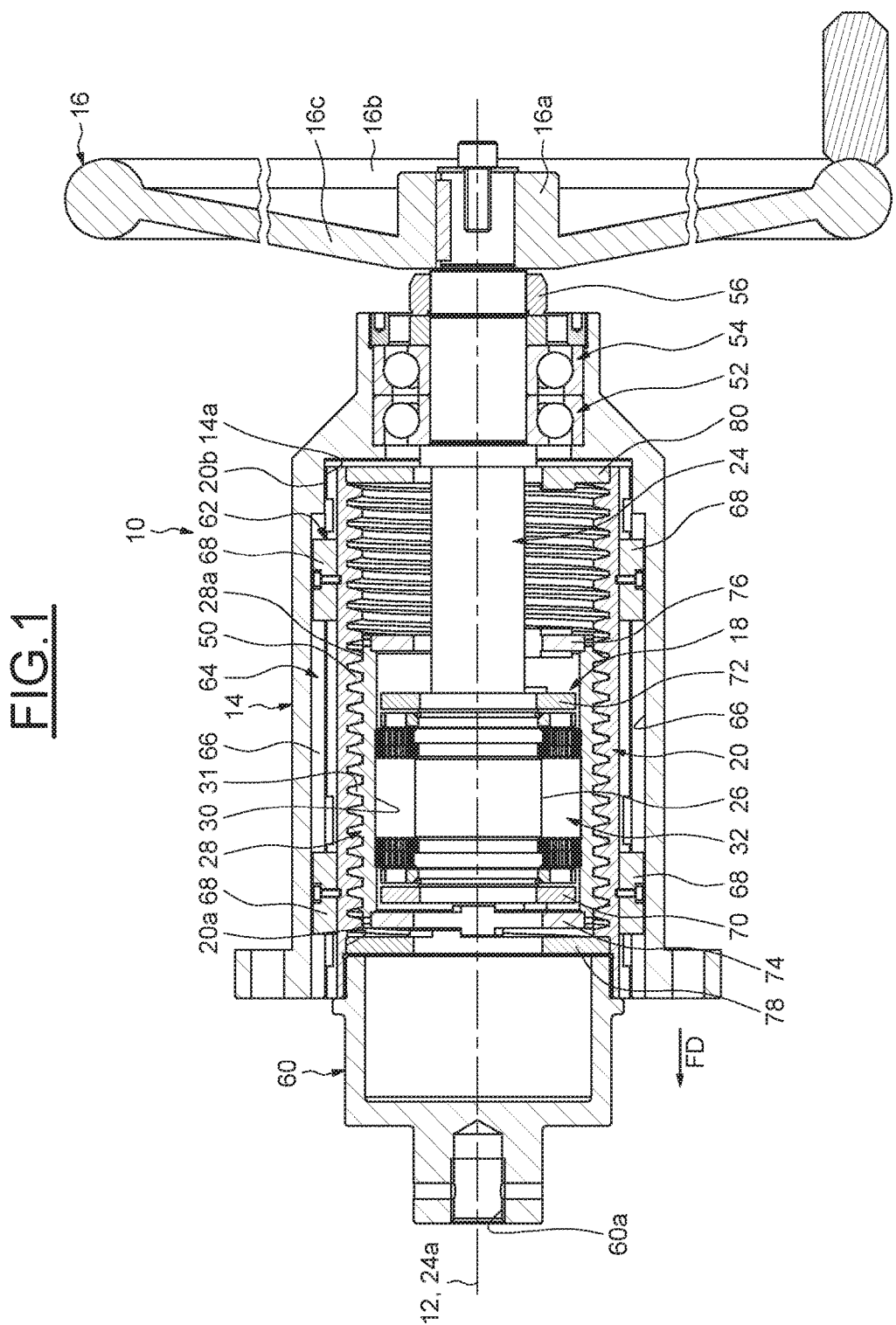
FIG. 1 is a cross-section of a valve operator assembly for gate valve according to a first example of the invention at a retracted longitudinal position.

A valve operator assembly 10 as shown on FIG. 1 is adapted for a gate valve (not shown) provided with a bonnet, a valve body covered by said bonnet and a moveable valve stem with an axis 12. Conventionally, the valve body has a flow bore and a transverse gate cavity that intersects the flow bore. The gate valve also comprises a gate having a gate opening extending transversely therethrough is disposed in the gate cavity. For more detail on such a gate valve, it could be referred to EP-B1-1 419 334 (SKF).

The valve operator assembly 10 comprises a tubular housing 14 adapted to be mounted directly on the bonnet of the gate valve or indirectly on said bonnet with an intermediate adapter sleeve, an input operable wheel 16 rotatably mounted with respect to said housing, and an inverted roller screw mechanism 18 and a translating and non-rotating outer sleeve 20 which are interposed between the wheel 16 and the valve stem of said valve to convert a rotational motion of said wheel into axial motion of said valve stem.

The inverted roller screw mechanism 18 is mounted into a bore 14a of the housing. One axial end of the housing 14 is adapted to be secured to the bonnet of the gate valve, for example by threads or bolts. In the illustrated example, the bore 14a has a stepped form. Alternatively, the bore 14a may have different shape.

Figure 2:
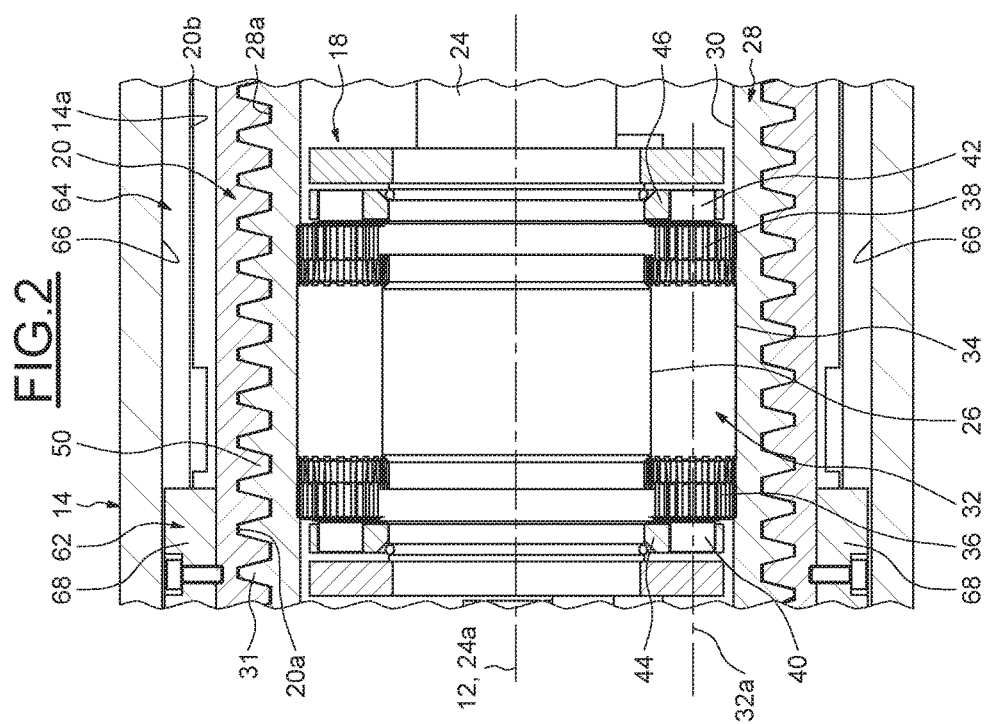
FIG. 2 is a detail view of FIG. 1, FIGS. 3 and 4 are cross-sections of the valve operator assembly of FIG. 1 at intermediate and extended longitudinal positions.

As shown more clearly on FIG. 2, the transmission mechanism 18 comprises a screw 24, with an axis 24a coaxial with the axis of the valve stem, provided with an outer thread 26, a nut 28 mounted coaxially about the screw 24 and provided with an inner thread 30, the internal diameter of which is greater than the external diameter of the outer thread 26, and a plurality of longitudinal rollers 32 arranged radially between the screw 24 and the nut 28. The screw 24 extends longitudinally through a cylindrical bore of the nut 28 on which the inner thread 30 is formed. The lead of the outer thread 26 of the screw is constant. The operable wheel 16 (FIG. 1) is supported by the screw 24. The screw 24 extends axially inside the housing 14 and axially protrudes outwards.

The nut 28 has a tubular form. The nut 28 is made in one part. The nut 28 extends axially inside the outer sleeve 20. The nut 28 also comprises an outer thread 31 formed on its outer cylindrical surface 28a. The outer thread 31 is radially opposed to the inner thread 30 formed into the bore of the nut. The outer thread 31 radially protrudes outwards with respect to the outer surface 28a. The outer thread 31 protrudes towards the outer sleeve 20. As will be described later, the inner nut 28 acts as a translating and non-rotating nut or as a rotating and non-translating nut.

The rollers 32 are identical to each other and are distributed regularly around the screw 24. Each roller 32 extends along an axis 32a which is coaxial with the axis 24a of the screw and comprises an outer thread 34 engaging the thread 26 of the screw and the thread 30 of the nut. Each roller 32 also comprises, at each axial end, outer gear teeth 36, 38 extending axially outwards the outer thread 34 and which are themselves extended axially by a cylindrical stud 40, 42 extending outwards. Each gear teeth 36, 38 are axially located between the associated stud 40, 42 and the outer thread 34. The outer thread 34 of each roller is axially located between the two gears 36, 38.

The roller screw mechanism 18 also comprises two annular gear wheels (not referenced) provided on the outer surface of the screw 24 and each comprising outer gear teeth meshing the gear teeth 36, 38 respectively of the rollers 32 for the synchronization thereof. The outer thread 26 of the screw is axially located between the two gear wheels.

The mechanism 18 further comprises two annular guides or spacer rings 44, 46 mounted on the outer surface of the screw 24. Said spacer rings 44, 46 are radially disposed between the screw 24 and the inner thread 30 of the nut without contact with said thread. Each spacer ring 44, 46 comprises a plurality of cylindrical through-recesses (not referenced) which are distributed regularly in the circumferential direction and inside which the studs 40, 42 of the rollers are housed. The spacer rings 44, 46 enable the rollers 32 to be carried and the regular circumferential spacing thereof to be kept. The mechanism 18 further comprises elastic retainer rings (not referenced) each mounted in a groove formed on the outer surface of the screw 24 in order to axially hold the corresponding spacer ring 44, 46.

Referring once again to FIG. 1, the outer sleeve 20 is radially disposed between the housing 14 and the nut 28 of the transmission mechanism. The outer sleeve 20 is mounted coaxially about the screw 24. The outer sleeve 20 radially surrounds the inverted roller screw mechanism 18. In the illustrated example, the sleeve 20 is made in one part. Alternatively, the sleeve may comprise several parts. The sleeve 20 extends axially inside the housing 14.

The outer sleeve 20 comprises a cylindrical bore 20a and an opposite outer cylindrical surface 20b. A radial gap is provided between the outer surface 20b of the sleeve and the bore 14a of the housing. The roller screw mechanism 18 is mounted inside the bore 20a. The outer sleeve 20 comprises an inner thread 50 engaged with the outer thread 31 of the nut 28. In this example, a direct threaded connection is provided between the sleeve 20 and the nut 28. The nut 28 and the sleeve 20 form a friction screw mechanism.

The inner thread 50 is formed into the bore 20a of the sleeve. The inner thread 50 radially protrudes inwards with respect to bore 20a. The shape of the inner thread 50 is complementary to that of the outer thread 31 of the nut, i.e. with pitch and lead that match. In the disclosed example, the thread 50 is of the acme type. Alternatively, it could be possible to foresee another type of inner thread for the sleeve 20.

The valve operator assembly 10 also comprises rolling bearings 52, 54 to guide the rotation of the screw 24 of the mechanism with respect to the housing 14. The rolling bearings 52, 54 are radially mounted between the outer surface of the screw 24 and the bore 14a of the housing. A retaining ring 56 is secured on the outer surface of the screw 24 to axially block the rolling bearings 52, 54. Axially on the opposite side to the ring 56, the rolling bearing 52 is axially mounted against a radial shoulder (not referenced) of the screw 24.

The rotational drive wheel 16 is directly mounted on the screw 24 of the mechanism. The wheel 16 is mounted on the outer surface of the screw 24. The wheel 16 is mounted on a part of the outer surface of the screw which is located outside of the housing 14. The wheel 16 may be secured on the screw 24 by any appropriate means, here by key(s) and a screw, or alternatively press-fitting, gluing, welding, pins, or clamping system etc.

The wheel 16 comprises an annular mounting hub 16a directly mounted on the outer surface of the screw 24 and an operable rim 16b connected to said hub. In the illustrated example, the operable rim 16b is adapted to be manually operated. Alternatively, the rim of the wheel 16 may be operable automatically with electric, hydraulic or pneumatic drive. The wheel 16 further comprises a plurality of radial arms or branches 16c connecting the hub 16a to the rim 16b. The branches 16c extend radially outwards from the hub 16a. In the illustrated example, the wheel 16 is made in one single part. Alternatively, the wheel may comprise several parts.

In the disclosed example, the rotational drive wheel 16 is directly mounted on the screw 24 of the mechanism with no interposition of additional element therebetween. Alternatively, the input member may comprises an adapter sleeve mounted on the screw 24 and the drive wheel 16 secured to said sleeve. The input member of the assembly is mounted on the screw 24 and secured to said screw.

The valve operator assembly 10 further comprises an adapter shaft 60 secured to the outer sleeve 20 and adapted to be connected to the valve stem of the gate valve. The valve stem is secured to the adapter shaft 60. A recess 60a is formed on the adapter shaft 60 and into which is mounted an end of the valve stem. The valve stem is connected to the outer sleeve 20 by any appropriate means, for example by threads and/or a pin and/or a clamp, etc. The recess 60a is formed at one end of the adapter shaft 60 while the axial opposite end is secured to the outer sleeve 20 by any appropriate means, here by threads. The outer sleeve 20 is connected to the valve stem of the gate valve by means of the adapter shaft 60. Alternatively, the outer sleeve 20 and the adapter shaft 60 may be made in one part. In this case, the outer sleeve 20 is directly connected to the valve stem.

The valve operator assembly 10 further comprises first anti-rotation and axial guide means 62 connected to the outer sleeve 20 and associated second anti-rotation and axial guide means 64 provided on the housing 14 in order to guide axial movements and to prevent angular movements of said sleeve relative to said housing.

The first anti-rotation and axial guide means 62 are secured to the outer sleeve 20. These means 62 radially protrude outwards with respect to the outer surface 20b of the sleeve. The anti-rotation and axial guide means 62 are located at a fixed position on the sleeve 20. The second anti-rotation and axial guide means 58 comprises two grooves 66 provided on the housing 14.

The anti-rotation and axial guide means 62 comprise a plurality of pins 68 secured to the outer sleeve 20. Each pin 68 radially protrudes outwards with respect to the outer surface 20b of the sleeve. Each pin 68 is mounted into one of the grooves 66 provided on the housing 14. Each pin 68 engages within the associated groove 66. Each pin 68 may be secured to the outer sleeve 20 by any other appropriate means, here by screwing or alternatively by fitting, gluing, or welding, etc. In the illustrated example, the anti-rotation and axial guide means 62 comprises four pins 68. Alternatively, the number of pins may be decreased or increased. In another variant, the anti-rotation and axial guide means 62 may comprise one or a plurality of keys, rotatable rollers, rolling bearings or plain bearings.

Each groove 66 is formed on the bore 14a of the housing. Each groove 66 is formed radially towards the outside from the bore 14a. Each groove 66 is made into the thickness of the housing 14. Each groove 66 is formed on a limited length of the bore 14a. Each groove 66 is delimited by two guide surfaces which face and extend parallel to each other. Each pin 68 is disposed between the guide surfaces of the associated groove. The guide surfaces of each groove form guideways for the associated pins 68. The guide surfaces of each groove extend axially on the housing 14, i.e. parallel with the axis 24a of the screw. The pins 68 may slide along the guide surfaces of the associated groove and comes into contact with said surfaces. Each groove 66 forms a straight anti-rotation portion extending parallel to the axis 24a of the screw. In the illustrated example, the housing 14 comprises two grooves 66 which are radially opposed. Alternatively, the housing 14 may comprise only one groove or three grooves or more. In the disclosed embodiment, the grooves 66 are formed directly on the housing 14. Alternatively, each groove may be delimited by two separate plates attached directly to the housing by any other appropriate means. In another variant, it could also be possible to foresee another type of components to cooperate with the associated protruding element of the first anti-rotation and axial guide means, for example two separate straight wires extending axially may be provided instead of a groove.

The valve operator assembly 10 further comprises first abutment means for blocking the translation of the nut 28 of the transmission mechanism relative to the screw 24. These abutment means comprise first and second rings 70, 72 secured to the screw 24. The first ring 70 is mounted at one end of the screw 24 while the second ring 72 is mounted on said screw axially on the side opposite to the first ring 70 with respect to the rollers 32. The abutment means also comprise third and fourth rings 74, 76 secured into the bore of the nut 28. Each ring 74, 76 axially faces the associated first or second ring 70, 72. As will be described later, the rings 70 to 76 also act as coupling means to connect the screw 24 and the nut 28.

The valve operator assembly 10 further comprises second abutment means for blocking the translation of the outer sleeve 20 with respect to the mechanism 18. These abutment means comprise first and second rings 78, 80 secured to the sleeve 20. The first ring 78 is mounted at the end of the bore 20a of the sleeve axially on the side of the adapter shaft, while the second ring 80 is mounted at the opposite end of said bore. Each ring 70 to 80 comprises a translating stop lug which forms rotary abutment.

From a position as illustrated on FIG. 1, when an operator applies a torque on the wheel 16 in order to drive the outer sleeve 20 in a forth direction FD (from right to left on FIG. 1), this torque is transmitted to the screw 24. With the rotation of the screw 24, the rollers 32 rotate on themselves about the screw 24 and rotate in the nut 28. The rollers 32 are rotationally guided by outer gear wheels provided on the screw and meshing with the gear teeth of the rollers. The rotational motion of a wheel 16 is converted into an axial displacement of the nut 28 in the forth direction FD.

The outer sleeve 20 moves together with the nut 28 without axial translation of said sleeve relative to said nut. As a matter of fact, the friction torque induced by the direct threaded connection between the outer sleeve 20 and the nut 28 is adapted to be higher than the friction torque induced by the roller screw mechanism 18. Both the nut 28 and the outer sleeve 20 are axially or longitudinally moved with respect to the screw 24 and the housing 14. The rotational motion of the wheel 16 is converted into an axial sliding of the outer sleeve 20 in the forth direction FD.

Figure 3:
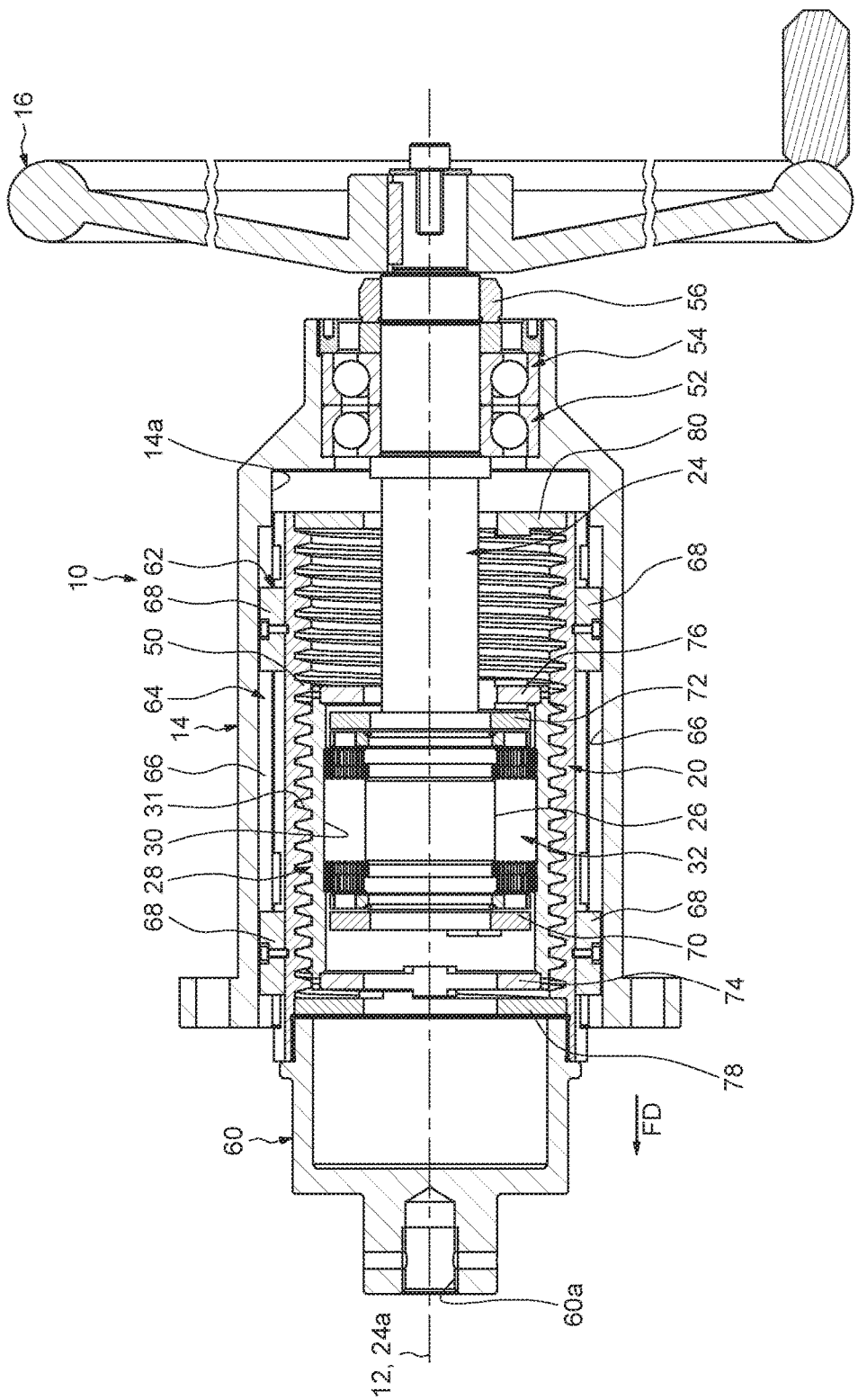
Figure 4:
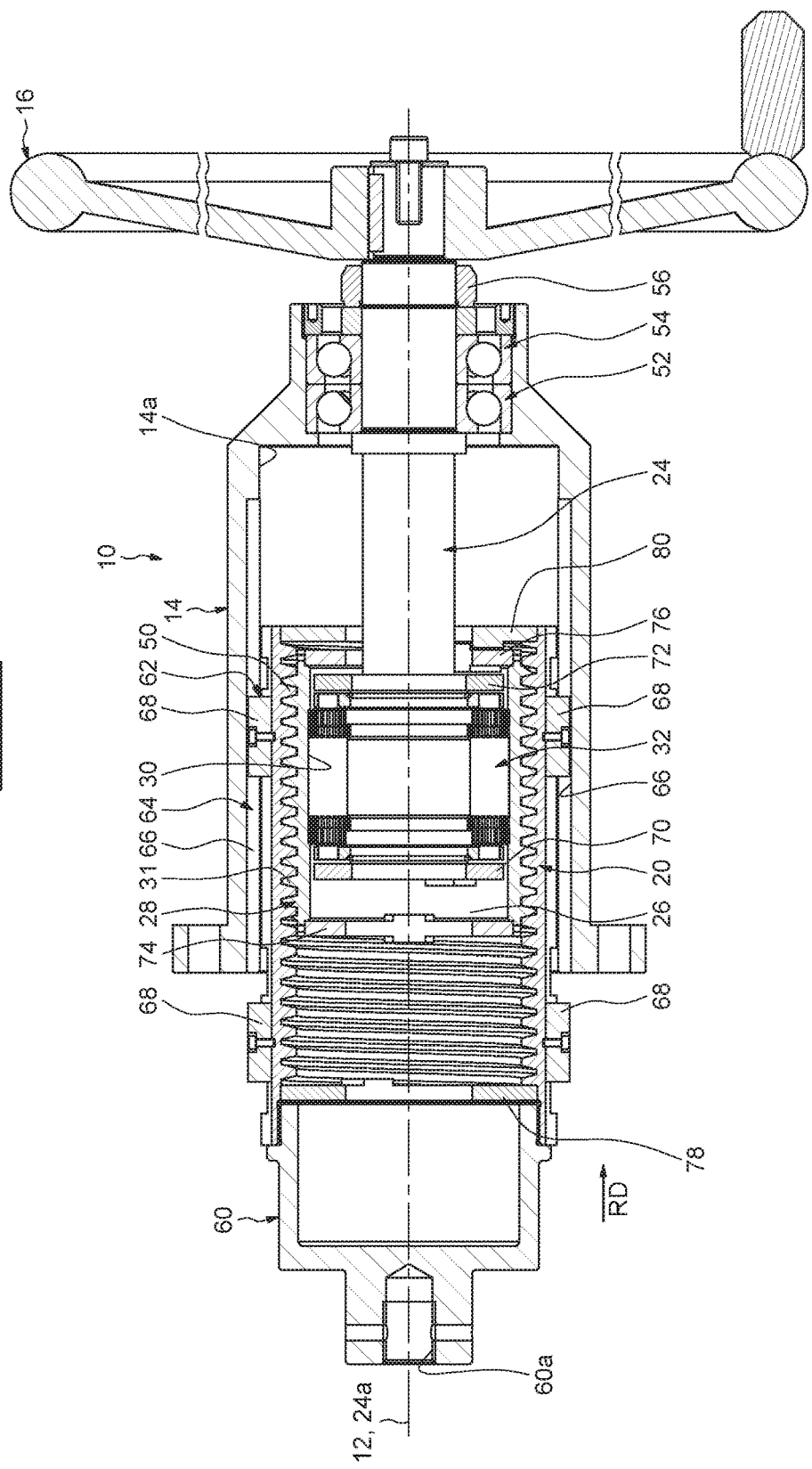

The forth stroke of the outer sleeve 20 together with the nut 28 relative to the screw 24 is performed until the fourth ring 76 of the first abutment means secured to said nut abuts against the second ring 72 secured to said screw as illustrated on FIG. 3. After that, the roller screw mechanism 18 is blocked. The nut 28 is coupled to the screw 24 and rotates together with said screw. Thus, the rotation of the screw 24 is transformed into an axial translation of the outer sleeve 20 relative to the nut 28, said screw and the housing 14. The outer sleeve 20 slides towards the outside of the housing 14. The outer sleeve 20 keeps on moving axially in the forth direction FD relative to the mechanism 18. The translation of the outer sleeve 20 is obtained until the second ring 80 of the second abutment means secured to said sleeve abuts against the fourth ring 76 of the first abutment means secured to the nut 28 as shown on FIG. 4.

From the position as illustrated on FIG. 4, when the operator applies a torque on the wheel 16 in an opposite direction in order to drive the outer sleeve 20 in a return direction RD (from left to right on FIG. 4), said sleeve moves together with the nut 28 without axial translation of said sleeve relative to said nut. The return stroke of outer sleeve 20 together with the nut 28 is performed until the third ring 74 of the first abutment means secured to said nut abuts against the first ring 70 of said abutment means secured to the screw 24. After that, since the nut 28 is coupled to the screw 24, with a rotation of said screw, the outer sleeve 20 moves axially relative to the nut 28. Accordingly, the rotational motion of the screw 24 is still converted into a displacement of the outer sleeve in the return direction RD. The outer sleeve 20 moves axially relative to the mechanism 18 and the housing 14 until the first ring 78 of the second abutment means secured to said sleeve abuts against the third ring 74 of the first abutment means as shown on FIG. 1.

When operating the gate valve, at the beginning of the valve opening and also at the end of the valve closing, the required operating torque on the wheel 16 is limited since the running phase of the outer sleeve 20 is obtained with the inverted roller screw mechanism 18. During the other operating runs which is exposed to a smaller force than for the forth direction FD in this example, and then consequently to a smaller torque, the axial translation of the outer sleeve 20 is obtained with the threaded connection between said sleeve and the nut 28. The number of turns required on the wheel 16 is thus minimized during these other operating runs. The assembly 10 could also be adapted in case other sequences are expected, for instance low torque at the end of opening stroke and/or low torque at the beginning of the closing stroke. In this embodiment, the sleeve 20 cooperates directly with the nut 28.

Figure 5:
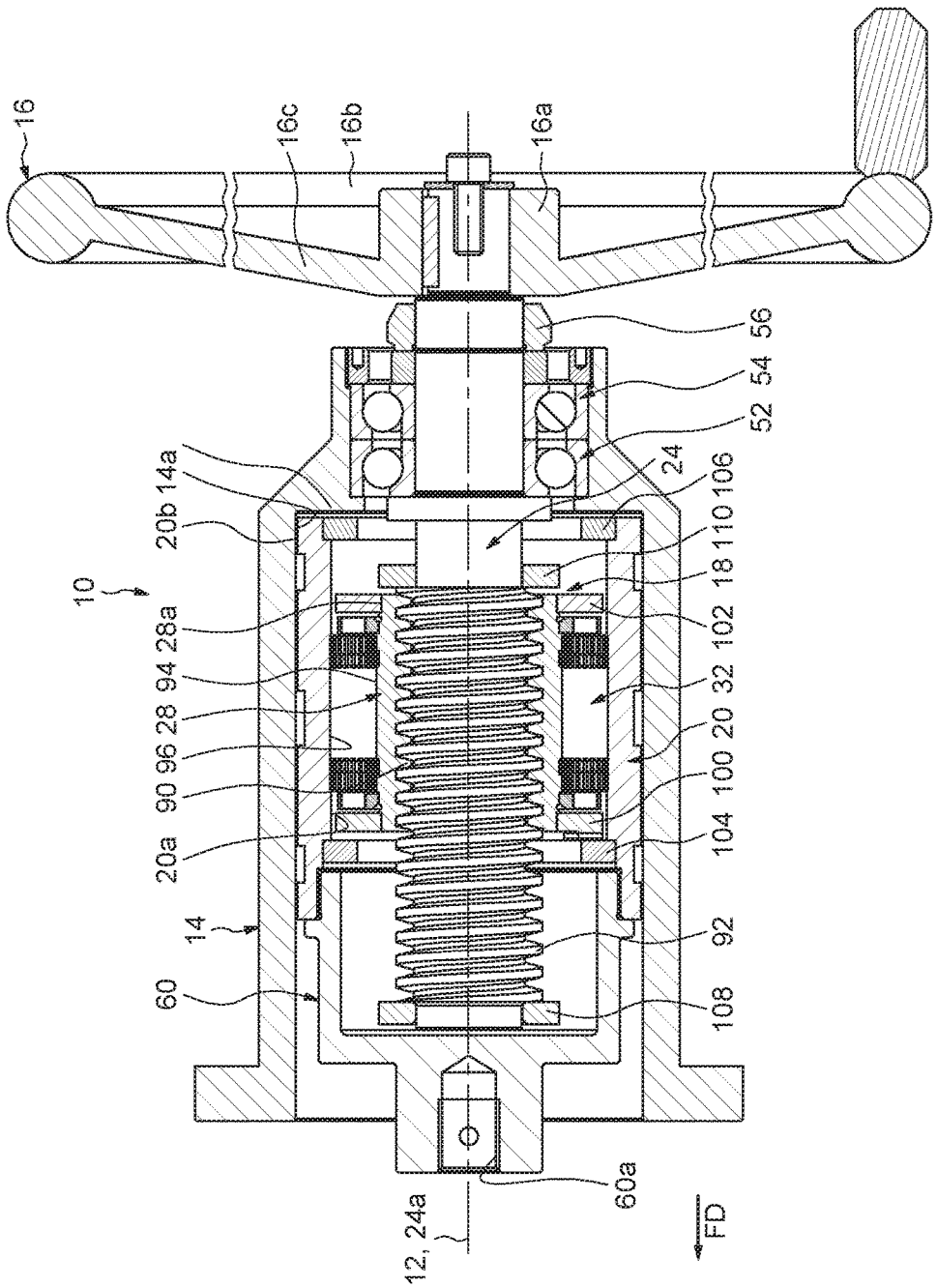
FIG. 5 is a cross-section of a valve operator assembly for gate valve according to a second example of the invention at a retracted longitudinal position.

The embodiment shown on FIG. 5, in which identical parts are given identical references, differs from the previous embodiment in that the disposition of the roller screw mechanism 18 and the friction screw mechanism is inverted. The inner nut 28 and the screw 24 form the friction screw mechanism. The sleeve 20 cooperates indirectly with the nut 28.

The nut 28 of the transmission mechanism comprises an inner thread 90 engaged with an outer thread 92 of the screw. The inner thread 90 is formed into the bore of the nut 28. The inner thread 90 radially protrudes inwards with respect to said bore. The shape of the inner thread 90 is complementary to that of the outer thread 92 of the screw. In the disclosed example, the thread 90 is of the acme type. Alternatively, it could be possible to foresee another type of inner thread for the nut 90. The screw 24 extends longitudinally through a cylindrical bore of the nut 28 on which the inner thread 90 is formed. The outer thread 92 radially protrudes outwards with respect to the outer surface of the screw.

The nut 28 also comprises an outer thread 94 formed on its outer cylindrical surface 28a. The outer thread 94 is radially opposed to the inner thread 90. The outer thread 94 radially protrudes outwards with respect to the outer surface 28a. The outer thread 94 protrudes towards the outer sleeve 20. As will be described later, the inner nut 28 acts as a rotating and non-translating nut or as a rotating and translating nut.

The rollers 32 are radially interposed between the nut 28 and the sleeve 20. The rollers 32 are distributed regularly around the sleeve 20. The outer thread of each roller engages the outer thread 94 of the nut and an inner thread 96 of the sleeve. The inner thread 96 is formed into the bore 20a of the sleeve. In this embodiment, the gear wheels meshing with the gear teeth of the rollers are provided on the outer surface of the nut 28. The spacer rings (not referenced) are also mounted on the outer surface of the nut 28. In this embodiment, the inverted roller screw mechanism 18 is formed by the nut 28, the rollers 32 and sleeve 20.

The valve operator assembly 10 further comprises first abutment means for blocking the translation of the sleeve 20 relative to the nut 28. These abutment means comprise first and second rings 100, 102 secured to the nut 28. The first ring 100 is secured at one end of the nut 28 while the second ring 102 is mounted on said nut axially on the side opposite to the first ring 100 with respect to the rollers 32. The abutment means also comprise third and fourth rings 104, 106 secured into the bore of the outer sleeve 20. Each ring 104, 106 axially faces the associated first or second ring 100, 102.

The assembly 10 also comprises second abutment means for blocking the translation of the outer sleeve 20 and the nut 28 with respect to the screw 24. These abutment means comprise first and second rings 108, 110 secured to the screw. The first ring 108 is mounted at the end of the bore of the screw axially on the side of the adapter shaft 60, while the second ring 110 is mounted on the side opposite to the first ring 108 with respect to the nut 28. Each ring 100 to 110 comprises a translating stop lug which forms rotary abutment. Similarly to the first embodiment, the assembly 10 also comprises the first and second anti-rotation and axial guide means (not shown) to guide axial movements and to prevent angular movements of the sleeve relative to said housing.

Figure 6:
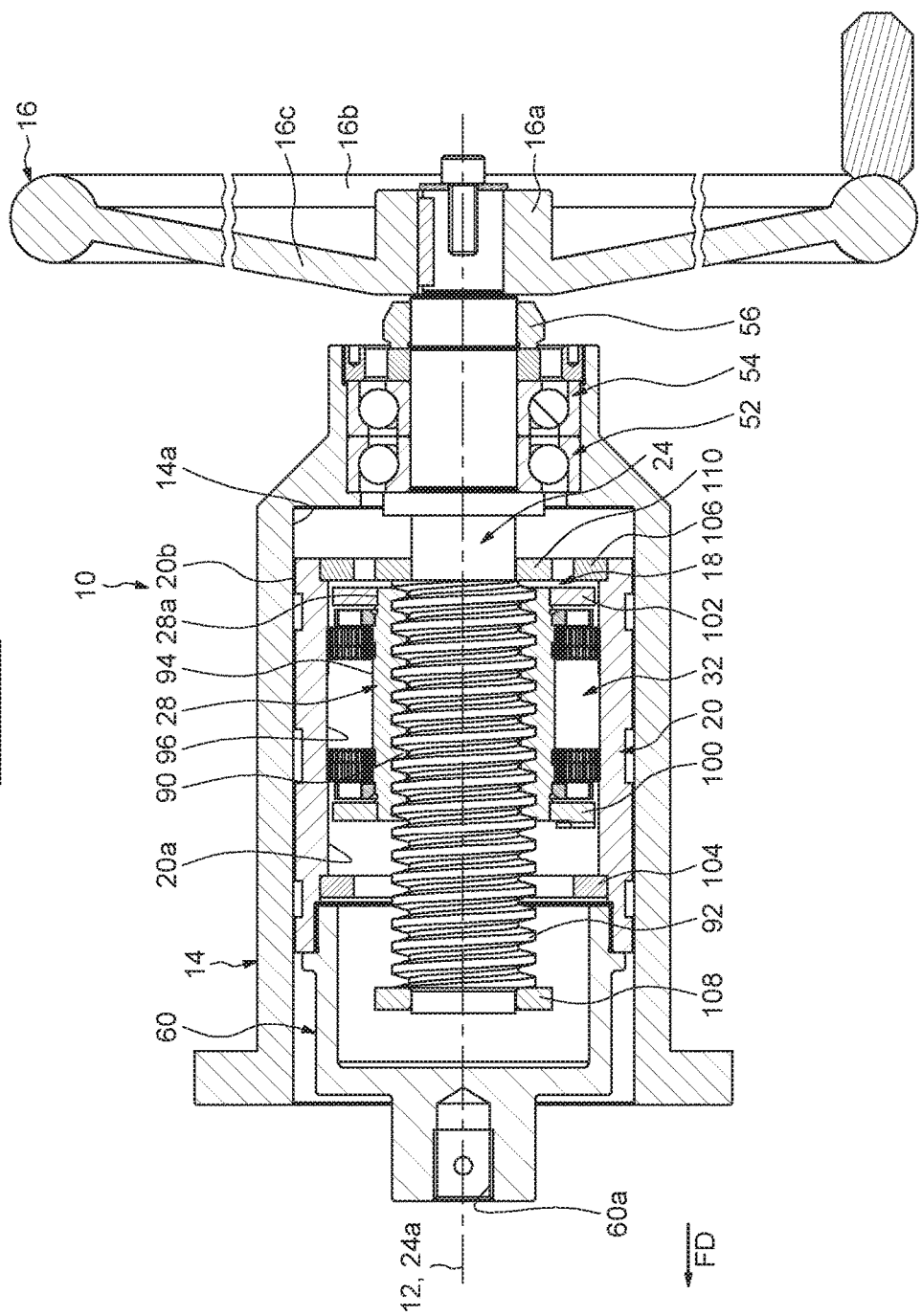
FIGS. 6 and 7 are cross-sections of the valve operator assembly of FIG. 5 at intermediate and extended longitudinal positions.
Figure 7:
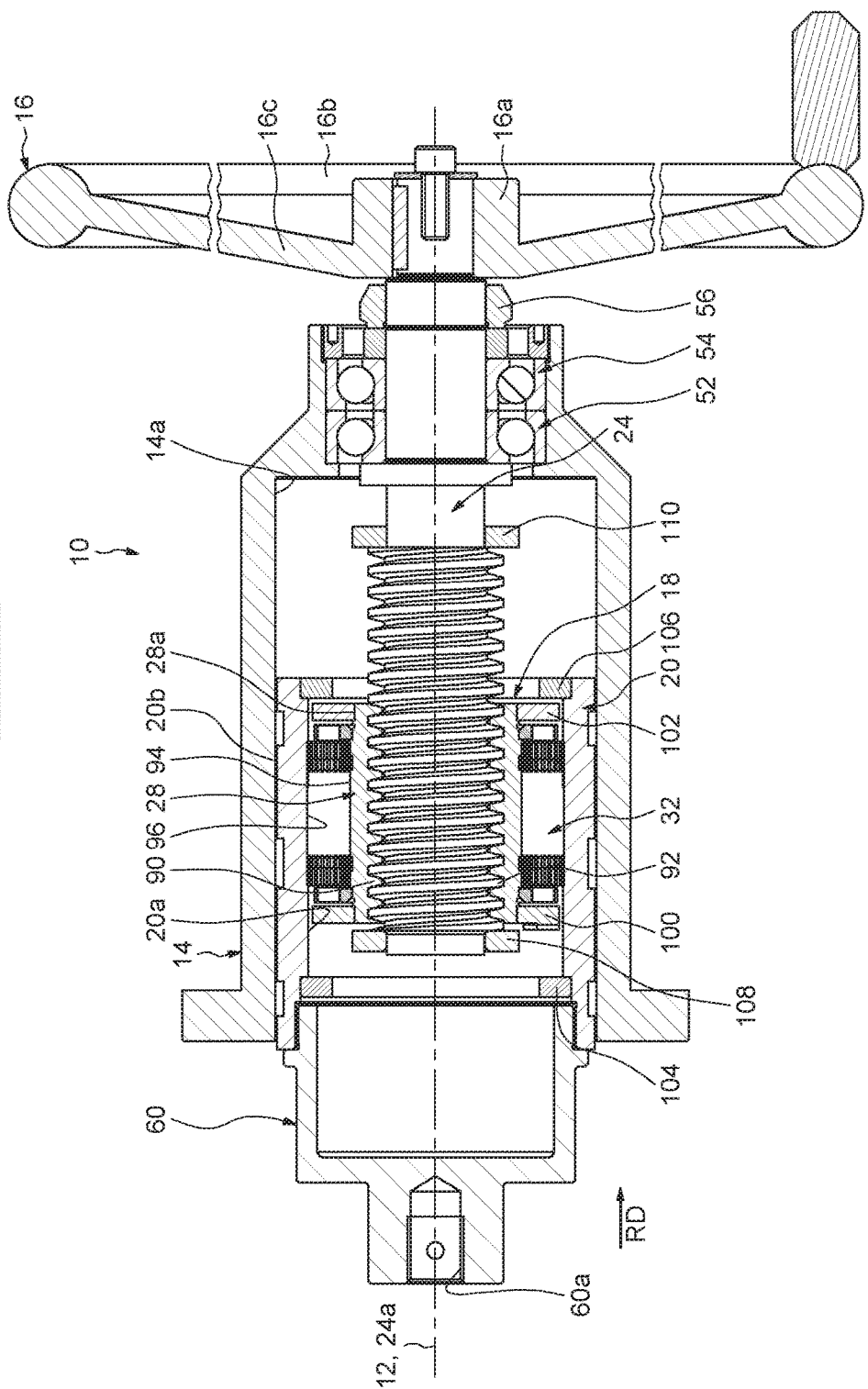

From a position as illustrated on FIG. 5, when the operator applies a torque on the wheel 16 in order to drive the outer sleeve 20 in a forth direction FD (from right to left on FIG. 5), this torque is transmitted to the screw 24. Since the friction torque induced by the direct threaded connection between the screw 24 and the nut 28 is adapted to be higher than the friction torque induced by the inverted roller screw mechanism 18, the rollers 32 rotate on themselves about the nut 28 and rotate in the sleeve 20. The sleeve 20 slides axially with respect to the nut 28, the screw 24 and the housing 14. The rotational motion of a wheel 16 is converted into an axial sliding of the sleeve 20 in the forth direction FD. The forth stroke of the outer sleeve 20 is performed until the fourth ring 106 of the first abutment means secured to said sleeve abuts against the second ring 102 secured to the nut 28 as shown on FIG. 6. After that, the sleeve 20 is coupled to the nut 28. Thus, with a rotation of the screw 24, the outer sleeve 20 moves together with the nut 28 without axial translation of said sleeve relative to said nut. The outer sleeve 20 keeps on moving axially in the forth direction FD until the first ring 100 of the first abutment means axially abuts against the first ring 108 of the second abutment means as shown on FIG. 7.

From the extended position as illustrated on FIG. 7, when the operator applies a torque on the wheel 16 in an opposite direction in order to drive the outer sleeve 20 in a return direction RD (from left to right on FIG. 7), said sleeve slides axially with respect to the nut 28, the screw 24 and the housing 14. The return stroke of outer sleeve 20 is performed until the third ring 104 of the first abutment means axially abuts against the first ring 100 of the second abutment means secured to the screw 24.

After that, since the sleeve 20 is coupled to the nut 28, said sleeve 20 moves together with said nut axially relative to the screw 24. Accordingly, the rotational motion of the screw 24 is still converted into a displacement of the outer sleeve in the return direction RD. The outer sleeve 20 moves axially until the second ring 102 of the first abutment means secured abuts against the second ring 110 of the second abutment means.

Figure 8:
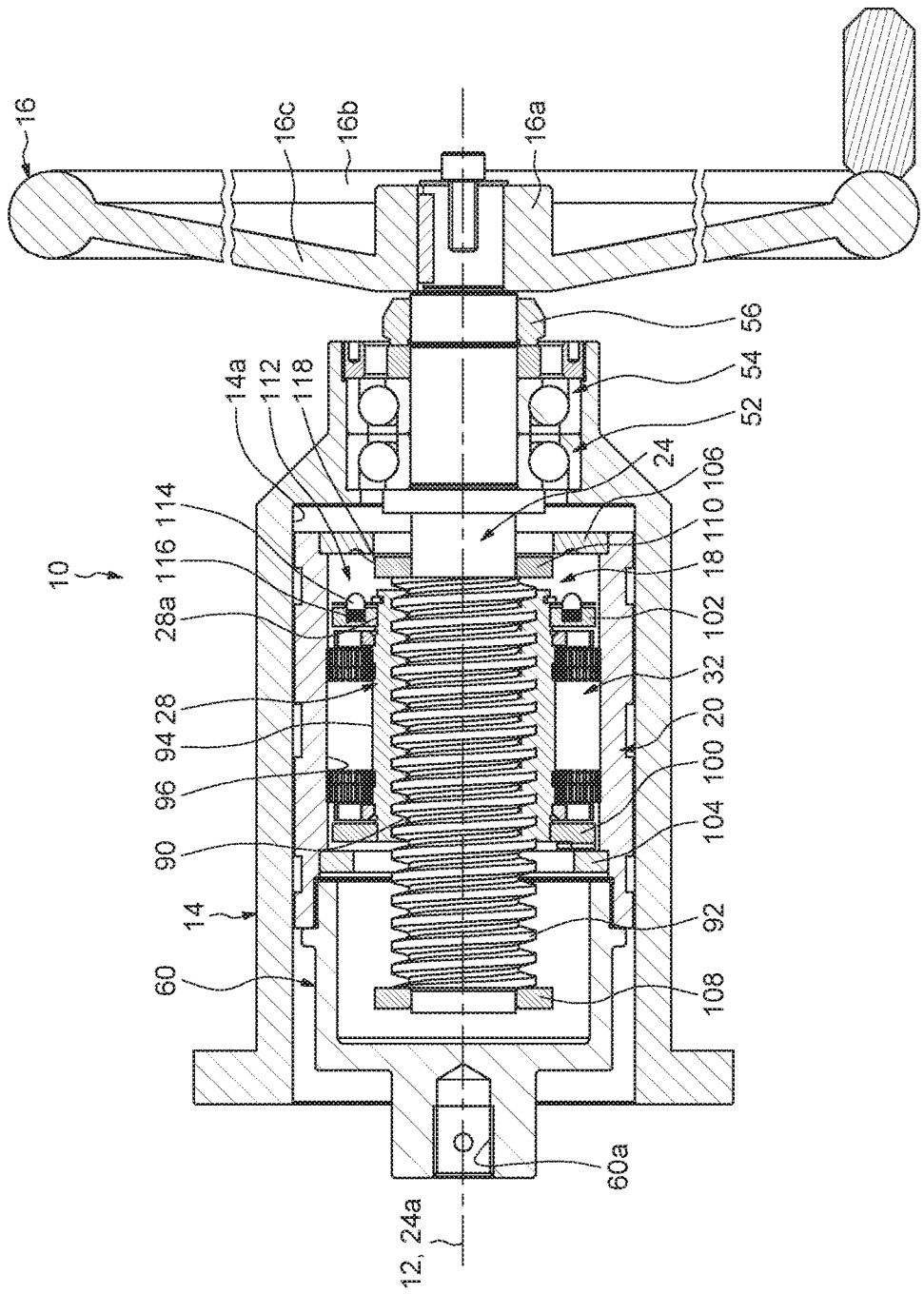
FIG. 8 is a cross-section of a valve operator assembly for gate valve according to a third example of the invention at a retracted longitudinal position.

The embodiment shown on FIG. 8, in which identical parts are given identical references, only differs from the previous embodiment in that the valve operator assembly 10 further comprises self-releasable coupling means 112 for maintaining a coupling state between the sleeve 20 and the nut 28 which are provided on one of the abutment means. In the disclosed embodiment, these coupling means 112 are disposed on the second ring 102 of the first abutment means. The coupling means 112 are provided with a plurality of pins 114 projecting axially towards the ring 106 secured to the sleeve 20, and with a plurality of elastic springs 116 each acting axially on one of these pins towards said ring. The pins 114 are distributed along the circumference of the ring 102. Recesses 118 are provided on the ring 106 in order to receive the pins 114. When the pins 114 engage into the recesses 28, the resistant torque induced by the self-releasable coupling means 112 is higher than the friction torque induced by the direct threaded connection between the screw 24 and the nut 28.

From an extended position, when the operator applies a torque on the wheel 16 in order to drive the outer sleeve 20 in a return direction, since the sleeve is coupled to the nut 28 by the self-releasable coupling means 112, said sleeve moves together with the nut axially relative to the screw 24 until the second ring 102 of the first abutment means axially abuts against the second ring 110 of the second abutment means. Then, the sleeve 20 slides axially with respect to the nut 28, the screw 24 and the housing 14 until the first ring 100 of the first abutment means axially abuts against the third ring 104.

In the disclosed example, the pins 114 of the self-releasable coupling means project axially and the associated springs exert an axial force on said pins. Alternatively, the pins 114 may project radially towards recesses formed on the bore of the sleeve and may be biased by associated elastic springs 116 acting radially. Alternatively, the pins may be replaced by balls. In another variant, the self-releasable coupling means may comprise a plurality of associated attractive magnets to generate a resistant torque. Alternatively, the self-releasable coupling means 112 could be installed on the first ring 100 of the first abutment means depending on the wanted sequence.

In the disclosed examples, with the anti-rotation and axial guide means 62 secured to the sleeve and engaged within the straight grooves 66 of the housing, the rotation of the screw 24 is converted into a linear translation of said sleeve. Said linear guidance of the sleeve 20 is done along its axis. The sleeve 20 only has an axial movement relative to the nut 28, the screw 24 and the housing 14. An angular movement of the sleeve 20 is prevented. The valve stem of the valve gate is axially moved together with the sleeve 20. In the described examples, the first anti-rotation and axial guide means 62 are connected to the sleeve 20 and the second anti-rotation and axial guide means 64 are provided on the housing 14. Alternatively, it is possible to have an inverted arrangement with the first anti-rotation and axial guide means 62 connected to housing 14 and the second anti-rotation and axial guide means 64 provided on sleeve 20.

Besides, integrating the anti-rotation and axial guide means into the valve operator assembly decreases friction at the translating gate of the associated valve and minimizes the required operating torque. Since the anti-rotation and axial guide means are not provided into the valve but rather integrated within the associated valve operator assembly, the sealing of the valve may be improved in the fluid pressurized area. Alternatively, it could however be possible to foresee a valve operator assembly having no axial guide means neither anti-rotation guide means, these means being provided into the valve.

The invention has been illustrated on the basis of a valve operator assembly for gate valve comprising an inverted roller screw mechanism. The invention can also be applied to a valve operator assembly having other type of roller screw mechanism such as standard planetary roller screw mechanism. The invention can also be applied to a valve operator assembly having a standard or an inverted ball screw mechanism or a direct threaded connection instead of a roller or ball screw mechanism. More generally, the design can be made with two screws of any type (roller screws, ball screws, friction screws) in whatever arrangement, inside/outside, as long as one has a higher friction than the other under the same external force. Then the one with the lowest friction starts first unless it is blocked.

Although the invention has been illustrated on the basis of a valve operator assembly for gate valve, it should be understood that the invention can also be used with other types of valves, for instance control or regulation valves or choke valves. The wheel may be operable manually or automatically for example with electric, hydraulic or pneumatic drive. The valve operator assembly may be used for instance with a surface gate or a subsea valve gate which may be actuated by a remote operating vehicle (ROV) torque tool or an actuator.

The invention claimed is:

1. A valve operator assembly for a valve comprising:
   a valve body, and
   a valve translating member axially moveable,
   a housing adapted to be mounted on the valve,
   an input member rotatably mounted with respect to the housing, and
   a transmission mechanism having a rotating screw provided with an outer thread and a translating nut surrounding and coaxial with the screw, the nut being provided with an inner thread, the transmission mechanism being adapted to convert rotation of the screw into axial translation of the nut, wherein
   the input member is mounted on the rotating screw, and
   an outer translating sleeve radially disposed between the housing and the translating nut and adapted to be connected to the valve translating member of the valve, the outer translating sleeve being provided with an inner thread and being connected to and movably driven relative to by the translating nut so as to slide relative to the housing when the rotating screw rotates.

2. The valve operator assembly according to claim 1, wherein the friction torque induced by the connection between the outer translating sleeve and the translating nut of the transmission mechanism is different from the friction torque induced by the transmission mechanism.

3. The valve operator assembly according to claim 1, further comprising an adapter shaft secured to the outer translating sleeve and adapted to be connected to the valve translating member of the valve.

4. The valve operator assembly according to claim 1, further comprising axial guide means provided both on the outer translating sleeve and the housing so as to guide axial movements of the sleeve relative to the housing.

5. The valve operator assembly according to claim 4, wherein the axial guide means also form anti-rotation means to prevent angular movement of the outer translating sleeve relative to the housing.

6. The valve operator assembly according to claim 5, wherein the anti-rotation and axial guide means comprise at least one protruding element secured to the outer translating sleeve, or to the housing, and at least one straight axial anti-rotation portion provided on the housing, or on the outer translating sleeve, and cooperating with the protruding element.

7. The valve operator assembly according to claim 1, wherein the input member comprises an operable wheel directly or indirectly mounted on the rotating screw of the transmission mechanism.

8. The valve operator assembly according to claim 1, wherein the transmission mechanism further comprises rolling elements that are radially provided between the outer thread of the screw and the inner thread of the translating nut that engage the threads.

9. The valve operator assembly according to claim 1, wherein the inner thread of the translating nut of the transmission mechanism is engaged with the outer thread of the rotating screw of the mechanism.

10. The valve operator assembly according to claim 1, wherein the inner thread of the outer translating sleeve is engaged with an outer thread provided on the translating nut of the transmission mechanism.

11. The valve operator assembly according to claim 1, further comprising rolling elements radially provided between the inner thread of the outer translating sleeve and an outer thread provided on the translating nut of the transmission mechanism, the rolling elements engaging the threads.

12. The valve operator assembly according to claim 1, further comprising abutment and coupling means for blocking the translation of the translating nut of the transmission mechanism relative to the screw and maintaining a coupling state between the nut and the screw.

13. The valve operator assembly according to claim 1, further comprising abutment and coupling means for blocking the translation of the outer translating sleeve relative to the translating nut of the transmission mechanism and maintaining a coupling state between the sleeve and the nut.

14. The valve operator assembly according to claim 1, further comprising at least one bearing radially provided between the rotating screw of the transmission mechanism and the housing.

15. A valve comprising:
   a valve body,
   a valve translating member axially moveable, and
   a valve operator assembly according to claim 1.

* * * * *